United States Patent [19]

Gross et al.

[11] Patent Number: 5,750,663

[45] Date of Patent: May 12, 1998

[54] SOLID SOAP/SYNDET COMPOSITION

[75] Inventors: Stephen F. Gross, Souderton; John F. Hessel, Doylestown, both of Pa.

[73] Assignee: Henkel Corporation, Plymouth Meeting, Pa.

[21] Appl. No.: 726,184

[22] Filed: Oct. 4, 1996

[51] Int. Cl.$^6$ .............................. C07G 3/00; C07H 1/00; C08B 37/00

[52] U.S. Cl. .................... 536/4.1; 536/124; 536/123.1; 510/108

[58] Field of Search .................... 514/25; 536/18.5, 536/18.6, 124, 4.1, 123.1; 510/108

[56] References Cited

U.S. PATENT DOCUMENTS

| | | | |
|---|---|---|---|
| 3,623,990 | 11/1971 | Cambre | 252/137 |
| 5,223,179 | 6/1993 | Connor et al. | 252/548 |
| 5,266,690 | 11/1993 | McCurry, Jr. et al. | 536/18.6 |

OTHER PUBLICATIONS

U.S. Statutory Invention Registration No. H1467, Published Aug. 1, 1995, Prieto et al.

*Primary Examiner*—John Kight
*Assistant Examiner*—Everett White
*Attorney, Agent, or Firm*—Ernest G. Szoke; Wayne C. Jaeschke; Steven J. Trzaska

[57] ABSTRACT

A solid hard-surface cleaning composition contains from about 20 to about 40% by weight of a fatty acid component; from about 10 to about 25% by weight of a polyol component; from about 2 to about 6% by weight of a base component; from about 2 to about 15% by weight of a foaming agent; and remainder, water, all weights being based on the total weight of the composition. The cleaning composition is particularly useful in combination with an abrasive substrate such as in abrasive scouring pads, providing lubricity, sudsing and improved detergency over untreated pads.

26 Claims, No Drawings

5,750,663

SOLID SOAP/SYNDET COMPOSITION

FIELD OF THE INVENTION

The present invention generally relates to a novel cleaning composition. More particularly, the invention is directed to a solid, soap- cleaning composition which may be used either alone or in combination with an abrasive substrate.

BACKGROUND OF THE INVENTION

There has been an increasing demand for liquid detergent compositions adapted for cleaning hard surfaces. These liquid detergent compositions are provided in convenient form and are especially formulated for this particular cleaning application. To obtain optimum cleaning and consumer acceptance, these detergent compositions must be homogeneous and easily pourable.

A variety of detergent compositions containing synthetic anionic detergents, soaps, or both, as well as detergency builders and abrasives, are known. These compositions usually require the presence of amides, and frequently contain soaps.

Soaps and amides are considered by the industry to be undesirable in many situations, however. Soaps in which the alkyl group is derived from coconut are relatively expensive, as compared to alkylbenzenesulfonate synthetic anionic detergents. Amides, on the other hand, are known at times to be subject to hydrolysis, resulting in the formation of ammonium soaps which can cause cleaning problems. For these and other reasons, the use of soaps and amides is disfavored by the industry.

It has been surprisingly discovered, however, that by employing a cleaning composition containing specific proportions of certain cleaning components, a solid-form cleaning composition can be formulated which is less expensive to make than known cleaning compositions, is not attended by many of the disadvantages outlined above, and may be used in combination with an abrasive substrate.

SUMMARY OF THE INVENTION

The present invention is directed to a solid hard-surface cleaning composition containing:

(a) from about 20 to about 40% by weight of a fatty acid component;

(b) from about 10 to about 25% by weight of a polyol component;

(c) from about 2 to about 6% by weight of a base component;

(d) from about 2 to about 15% by weight of a foaming agent; and (e) remainder, water, all weights being based on the total weight of the composition. The cleaning composition is particularly useful in combination with an abrasive substrate such as in abrasive scouring pads, providing lubricity, sudsing and improved detergency over untreated pads.

The present invention is also directed to a process for making a hard-surface cleaning composition involving the steps of:

(a) providing from about 20 to about 40% by weight of a fatty acid component;

(b) providing from about 10 to about 25% by weight of a polyol component;

(c) providing from about 2 to about 6% by weight of a base component;

(d) providing from about 2 to about 15% by weight of a foaming agent;

(e) providing remainder, water, all weights being based on the total weight of the composition;

(f) mixing components (a)–(e) at a temperature above about 60° C. to form a fluid hard-surface cleaning composition; and (g) allowing the fluid hard-surface cleaning composition to cool to form a solid hard-surface cleaning composition.

DESCRIPTION OF THE INVENTION

Other than in the operating examples, or where otherwise indicated, all numbers expressing quantities of ingredients or reaction conditions used herein are to be understood as being modified in all instances by the term "about".

The essential individual components of the composition of the present invention are a fatty acid, a polyol, a base, a foaming agent and water. Optional components include detergency builders and abrasive substrates whether in particulate and/or pad form.

The fatty acid component of the hard-surface cleaning composition according to the invention can be any saturated or unsaturated, branched or linear carboxylic acid having from 8 to 30 carbon atoms or a mixture of such acids. In a preferred embodiment of the hard-surface cleaning composition according to the invention, the fatty acid component is a mixture of fatty acids comprised of 29% by weight of a typical commercial grade stearic acid and 5% by weight of a typical commercial grade partially hydrogenated coconut fatty acid. An example of a typical commercial grade stearic acid is EMERY® 420 Stearic Acid, a trademark product of Henkel Corporation, Emery Group, Cincinnati, Ohio, which has an average weight percent composition of 4.0% myristic acid, trace pentadecanoic acid, 29% palmitic acid, 1.5% margaric acid, and 65% stearic acid. An example of a typical commercial grade partially hydrogenated coconut fatty acid is EMERY® 621 Coconut Fatty Acid, a trademark product of Henkel Corporation, Emery Group, Cincinnati, Ohio, which has an average weight percent composition of 48% lauric acid, 20% myristic acid, 10% palmitic acid, 2% stearic acid, 4% caprylic acid, 5% capric acid, and 10% oleic acid. Preferably, such a fatty acid is at least 95% neutralized by sodium hydroxide. The amount of fatty acid component that can be used in the hard-surface cleaning composition according to the invention can range from about 20 to about 40% by weight, and preferably from about 24 to about 34% by weight, based on the weight of the composition.

The fatty acids employed in the present invention require neutralization with some sort of base. The preferred degree of neutralization of the fatty acids 100%, with the resulting soap having a pH of about 9–10. The fatty acids are neutralized by a base component. Examples of suitable bases which may be employed include, but are not limited to, alkali metal hydroxides such as sodium hydroxide and potassium hydroxide. The amount of base component that can be used in the hard-surface cleaning composition according to the invention can range from about 2 to about 6% by weight, and preferably from about 3 to about 4.5% by weight, based on the weight of the composition.

The composition of the present invention requires the presence of a polyol component in order to facilitate the solidification/crystallization of the neutralized fatty acids at ambient temperatures so that the resulting composition, in solid form, does not feel tacky or become flaky. The polyol component of the soap bars according to the invention can be any aliphatic compound having 2 or more alcohol functionalities. Such polyols include diols, triols, tetraols, etc. Examples of such polyols include, but are not limited to, ethylene glycol, 1,2-propylene glycol, 1,3-propylene glycol, diethylene glycol, dipropylene glycol, triethylene glycol, 1,6-hexylene glycol, glycerine, polyglycerols, monosaccharides such as glucose or fructose, disaccharides such as sucrose, sorbitol, and polyvinyl alcohol. Preferred polyols include 1,2-propylene glycol, glycerine, polyglycerol, and sorbitol. The most preferred polyol is propylene glycol. The amount of polyol component that can be used in the hard-surface cleaning composition according to the invention can range from about 10 to about 30% by weight, and preferably from about 15 to about 20% by weight, based on the weight of the composition.

A foaming agent is employed in the present composition in order to facilitate the formation of suds/foam when the composition is used to clean hard surfaces. A variety of foaming agents may be employed in accordance with the present invention. Examples of suitable foaming agents include, but are not limited to, short chain C8–C10 fatty acids, amine oxides, amides, certain nonionic surfactants, alkyl sulfates, alkyl ether sulfates, sulfonates, sulfosuccinates, sarcosinates and mixtures thereof. The amount of foaming agent that can be used in the hard-surface cleaning composition according to the invention can range from about 2 to about 15% by weight, and preferably from about 4 to about 8% by weight, based on the weight of the composition.

In a particularly preferred embodiment of the present invention, a syndet mixture is used as the foaming agent in order to generate the formation of foam. The syndet mixture is preferably based on a combination of a nonionic surfactant, preferably an alkyl polyglycoside of formula I:

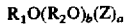

$$R_1O(R_2O)_b(Z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6, and an anionic surfactant, preferably an amide of formula II:

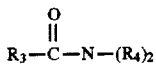

$$\underset{R_3-C-N-(R_4)_2}{\overset{O}{\|}} \qquad (II)$$

wherein $R_3$ is an alkyl group containing from about 8 to about 18 carbon atoms and each $R_4$ is the same or different and is selected from the group consisting of hydrogen, $C_{1-3}$ alkyl, $C_{1-3}$ alkanol, —($C_2H_4O$—), and mixtures thereof.

The alkyl polyglycosides which can be used in the compositions according to the invention have the formula I

$$R_1O(R_2O)_b(z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. GLUCOPON® 425 Surfactant—an alkyl polyglycoside in which the alkyl group contains 8 to 16 carbon atoms and having an average degree of polymerization of 1.48.
3. GLUCOPON® 625 Surfactant—an alkyl polyglycoside in which the alkyl groups contains 12 to 16 carbon atoms and having an average degree of polymerization of 1.6.
4. APG® 325 Surfactant—an alkyl polyglycoside in which the alkyl groups contains 9 to 11 carbon atoms and having an average degree of polymerization of 1.5.
5. GLUCOPON® 600 Surfactant—an alkyl polyglycoside in which the alkyl groups contains 12 to 16 carbon atoms and having an average degree of polymerization of 1.4.
6. PLANTAREN® 2000 Surfactant—a $C_{8-16}$ alkyl polyglycoside in which the alkyl group contains 8 to 16 carbon atoms and having an average degree of polymerization of 1.4.
7. PLANTAREN® 1300 Surfactant—a $C_{12-16}$ alkyl polyglycoside in which the alkyl groups contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycosicle increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

Other alkyl polyglycosides which can be used in the compositions according to the invention are those in which the alkyl moiety contains from 6 to 18 carbon atoms in which and the average carbon chain length of the composition is from about 9 to about 14 comprising a mixture of two or more of at least binary components of alkylpolyglycosides, wherein each binary component is present in the mixture in relation to its average carbon chain length in an amount effective to provide the surfactant composition with the average carbon chain length of about 9 to about 14 and wherein at least one, or both binary components, comprise a Flory distribution of polyglycosides derived from an acid-catalyzed reaction of an alcohol containing 6–20 carbon atoms and a suitable saccharide from which excess alcohol has been separated.

The amides which may be employed in the present invention have is the general formula II:

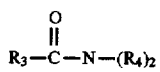

(II)

wherein $R_3$ is an alkyl group containing from about 8 to about 18 carbon atoms and each $R_4$ is the same or different and is selected from the group consisting of hydrogen, $C_{1-3}$ alkyl, $C_{1-3}$ alkanol, and —$(C_2H_4O$—), and mixtures thereof. Examples of amides suitable for use in the present invention include, but are not limited to, monoethanolamides and diethanolamides. A particularly preferred amide for use in the present invention is cocamide DEA, commercially available from Henkel Corporation, Ambler, Pa., under the tradename STANDAMID® SD.

In a particularly preferred embodiment, the alkyl polyglycoside employed is one wherein in formula I $R_1$ is a monovalent organic radical having from about 12 to about 16 carbon atoms, b is zero, and a is a number having a value of from about 1 to about 2. The alkyl polyglycoside and amide are preferably mixed at an active ratio of from about 2:1 to about 6:1, and preferably about 4:1. In a particularly preferred embodiment of the invention, the syndet mixture used as a foaming agent contains from about 3 to about 5% by weight of an alkyl polyglycoside, and from about 0.5 to about 1.5% by weight of an amide, all weights being based on the weight of the hard surface cleaning composition.

The remaining essential component of the hard surface cleaning composition of the present invention is water. The amount of water that can be present in the hard-surface cleaning composition according to the invention can range from about 20 to about 40% by weight, and preferably from about 32 to about 38% by weight, based on the weight of the composition. It was surprisingly discovered that when the above-disclosed components comprising the cleaning composition were employed in the disclosed amounts, a relatively large amount of water could be used in the formulation without the resulting hard surface cleaning composition, in solid form, being sticky or flaky. Typically, the presence of these amounts of water in a solid cleaning composition are attended to by the above-outlined disadvantages. However, when the disclosed components are employed in the specified amounts, a non-tacky, non-flaky solid cleaning composition can be formulated.

According to another emobodiment of the present invention, there is also provided a process for making a solid-form, hard surface cleaning composition. The process involves mixing the above-disclosed components at a temperature in excess of 60° C., and preferably in a range of from about 75° to 80° C. Once the components are sufficiently mixed, such as by stirring, the resulting mixture is allowed to cool to ambient temperatures, i.e., 20°–25° C., thereby solidifying into its final, solid form.

The above-disclosed hard surface cleaning composition, while effective at cleaning hard surfaces by itself, may be employed in combination with an abrasive substrate. The abrasive substrate further enhances the cleaning properties of the composition by enabling stuck-on dirt and grime to be loosened and then removed from the hard surface being cleaned. Examples of suitable abrasive substrates include, but are not limited to, particulate materials and/or abrasive pads. When particulate materials are employed as the abrasive substrate, they are typically incorporated (mixed) directly into the hard-surface cleaning composition while it is in fluid form. Once the fluid composition hardens into a solid form at ambient temperatures, the particulate abrasives remain dispersed throughout the solid. Examples of suitable particulate abrasives include, but are not limited to, quartz, pumice, pumicite, talc, silica sand, calcium carbonate, china clay, zirconium silicate, bentonite, diatomaceous earth, whiting, feldspar and aluminum oxide.

In another emobodiment, an abrasive pad may be employed as the abrasive substrate. When an abrasive is employed, the fluid-form cleaning composition may be applied onto at least one side of the abrasive pad. Upon cooling to room temperature, the composition solidifies, thereby forming a solid layer thereon which is both non-sticky and non-flaky. No further drying of the solid-form cleaning composition is necessary. The abrasive pad may be made of any suitable, abrasive material such as, for example, steel wool or an appropriate polymeric material. The amount of abrasive substrate that is used in combination with the hard surface cleaning composition of the invention, whether in particulate or pad form, will depend on the desires of those skilled in the art.

The present invention will be better understood from the examples which follow, all of which are intended to be illustrative only and not meant to unduly limit the scope of the invention. Unless otherwise indicated, percentages are on a weight-by-weight basis.

EXAMPLE 1

A hard-surface cleaning composition in accordance with the present invention was prepared having the following formulation:

| Component | %/wt. |
|---|---|
| (a) EMERY 420 stearic acid | 29.0 |
| (b) EMERY 621 coconut fatty acid | 5.0 |
| (c) propylene glycol | 15.0 |
| (d) NaOH (50%) | 8.3 |
| (e) urea | 9.2 |
| (f) GLUCOPON ® 625 UP | 7.5 |
| (g) STANDAMID ® SD | 1.0 |
| (h) water | 25.0 |
| | 100.0 |

EMERY 420 stearic acid is predominately a C16–C18 fatty acid commercially available from Henkel Corp., Emery Division, Cincinatti, OH.
EMERY 621 coconut fatty acid is predominately a C12–C14 fatty acid commercially available from Henkel Corp., Emery Division, Cincinatti, OH.
GLUCOPON ® 625 UP is an alkyl polyglycoside having a C12–C16 monovalent organic radical and an average degree of polymerization of 1.6.
STANDAMID ® SD is a cocamide DEA, commercially available from Henkel Corp., Emery Division, Cincinatti, OH.

The above-identified components were mixed at a temperature of about 75° C., with stirring, and allowed to cool to room temperature, thus forming a solid, hard-surface cleaning composition possessing non-sticky, non-flaky physical properties.

EXAMPLE 2

A hard-surface cleaning composition in accordance with the present invention was prepared having the following formulation:

| Component | %/wt. |
| --- | --- |
| (a) EMERY 420 stearic acid | 19.0 |
| (b) EMERY 621 coconut fatty acid | 5.0 |
| (c) propylene glycol | 20.0 |
| (d) NaOH (50%) | 8.3 |
| (e) urea | 9.2 |
| (f) GLUCOPON ® 625 UP | 7.5 |
| (g) STANDAMID ® SD | 1.0 |
| (h) water | 30.0 |
| | 100.0 |

What is claimed is:

1. A solid, hard surface cleaning composition comprising:
   (a) from about 20 to about 40% by weight of a fatty acid component;
   (b) from about 10 to about 25% by weight of a polyol component;
   (c) from about 2 to about 6% by weight of a base component;
   (d) from about 2 to about 15% by weight of a foaming agent; and
   (e) remainder, water, all weights being based on the total weight of the composition.

2. The composition of claim 1 wherein the fatty acid component is a mixture of a C16–C18 fatty acid and a C12–C14 fatty acid.

3. The composition of claim 1 wherein the polyol component is a propylene glycol.

4. The composition of claim 1 wherein the base component is sodium hydroxide.

5. The composition of claim 1 wherein the foaming agent is selected from the group consisting of a C8–C10 fatty acid, an amine oxide, an amide, a nonionic surfactant, an alkyl sulfate, an alkyl ether sulfate, a sulfonate, a sulfosuccinate, a sarcosinate, and mixtures thereof.

6. The composition of claim 5 wherein the foaming agent is a mixture of an amide and a nonionic surfactant.

7. The composition of claim 6 wherein the nonionic surfactant is an alkyl polyglycoside of formula I:

$$R_1O(R_2O)_b(Z)_a \quad\quad I$$

wherein $R_1$ is a monovalent organic radical having from about 8 to about 16 carbon atoms; $R_2$ is a divalent alkylene radical having from 2 to 4 carbon atoms; Z is a saccharide residue having 5 or 6 carbon atoms; b is zero; and a is a number having a value of from about 1 to about 2.

8. The composition of claim 7 wherein the alkyl polyglycoside and amide are mixed in an actives ratio of about 4:1.

9. The composition of claim 1 further comprising an abrasive substrate selected from the group consisting of particulate material, an abrasive pad, and combinations thereof.

10. The composition of claim 9 wherein the composition is present on at least one side of the abrasive pad.

11. A solid, hard surface cleaning composition comprising:
   (a) from about 20 to about 40% by weight of a mixture of a C16–C18 fatty acid and a C12–C14 fatty acid;
   (b) from about 10 to about 25% by weight of a propylene glycol;
   (c) from about 2 to about 6% by weight of sodium hydroxide;
   (d) from about 2 to about 15% by weight of a foaming agent, the foaming agent containing a mixture of:
      (i) an alkyl polyglycoside of formula I $$R_1O(R_2O)_b(Z)_a \quad\quad I$$

wherein $R_1$ is a monovalent organic radical having from about 8 to about 16 carbon atoms; $R_2$ is a divalent alkylene radical having from 2 to 4 carbon atoms; Z is a saccharide residue having 5 or 6 carbon atoms; b is zero; and a is a number having a value of from about 1 to about 2; and
      (ii) an amide, wherein the alkyl polyglycoside and amide are mixed in an actives ratio of about 4:1; and
   (e) remainder, water, all weights being based on the total weight of the composition.

12. The composition of claim 11 further comprising an abrasive substrate selected from the group consisting of particulate material, an abrasive pad, and combinations thereof.

13. A process for making a solid, hard surface cleaning composition comprising:
   (a) providing from about 20 to about 40% by weight of a fatty acid component;
   (b) providing from about 10 to about 25% by weight of a polyol component;
   (c) providing from about 2 to about 6% by weight of a base component;
   (d) providing from about 2 to about 15% by weight of a foaming agent;
   (e) providing remainder, water, all weights being based on the total weight of the composition;
   (f) mixing components (a)–(e) at a temperature above about 60° C. to form a fluid hard-surface cleaning composition; and
   (g) allowing the fluid hard-surface cleaning composition to cool to form a solid hard-surface cleaning composition.

14. The process of claim 13 wherein the fatty acid component is a mixture of a C16–C18 fatty acid and a C12–C14 fatty acid.

15. The process of claim 13 wherein the polyol component is a propylene glycol.

16. The process of claim 13 wherein the base component is sodium hydroxide.

17. The process of claim 13 wherein the foaming agent is selected from the group consisting of a C8–C10 fatty acid, an amine oxide, an amide, a nonionic surfactant, an alkyl sulfate, an alkyl ether sulfate, a sulfonate, a sulfosuccinate, a sarcosinate, and mixtures thereof.

18. The process of claim 17 wherein the foaming agent is a mixture of an amide and a nonionic surfactant.

19. The process of claim 18 wherein the nonionic surfactant is an alkyl polyglycoside of formula I;

$$R_1O(R_2O)_b(Z)_a \quad\quad I$$

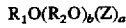

wherein $R_1$ is a monovalent organic radical having from about 8 to about 16 carbon atoms; $R_2$ is a divalent alkylene radical having from 2 to 4 carbon atoms; Z is a saccharide residue having 5 or 6 carbon atoms; b is zero; and a is a number having a value of from about 1 to about 2.

20. The process of claim 19 wherein the alkyl polyglycoside and amide are mixed in an actives ratio of about 4:1.

21. The process of claim 13 further comprising adding an abrasive substrate selected from the group consisting of particulate material, an abrasive pad, and combinations thereof, to the solid, hard surface cleaning composition.

22. The process of claim 21 wherein the solid, hard surface cleaning composition is added onto at lease one side of the abrasive pad.

23. The process of claim 13 wherein components (a)–(e) are mixed at a temperature ranging from about 75° to about 80° C. to form a fluid, hard surface cleaning composition.

24. The process of claim 13 wherein the fluid, hard surface cleaning composition is allowed to cool to room temperature.

25. A process for making a solid, hard surface cleaning composition comprising:

(a) providing from about 20 to about 40% by weight of a mixture of a C16–C 18 fatty acid and a C12–C14 fatty acid;

(b) providing from about 10 to about 25% by weight of a propylene glycol;

(c) providing from about 2 to about 6% by weight of sodium hydroxide;

(d) providing from about 2 to about 15% by weight of a foaming agent containing a mixture of:

(i) an alkyl polyglycoside of formula I

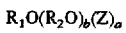
$$R_1O(R_2O)_b(Z)_a \qquad \mathrm{I}$$

wherein $R_1$ is a monovalent organic radical having from about 8 to about 16 carbon atoms; $R_2$ is a divalent alkylene radical having from 2 to 4 carbon atoms; Z is a saccharide residue having 5 or 6 carbon atoms; b is zero; and a is a number having a value of from about 1 to about 2; and (ii) an amide, wherein the alkyl polyglycoside and amide are mixed in an actives ratio of about 4:1;

(e) providing remainder, water, all weights being based on the total weight of the composition;

(f) mixing components (a)–(e) at a temperature of from about 75° to about 80° C. to form a fluid, hard-surface cleaning composition.

26. The process of claim 25 further comprising applying the fluid, hard surface cleaning composition onto at least one side of an abrasive pad.

* * * * *